(12) United States Patent
Ferstl et al.

(10) Patent No.: US 8,455,559 B2
(45) Date of Patent: Jun. 4, 2013

(54) PREPARING EXPANDABLE STYRENE POLYMERS

(75) Inventors: Wolfgang Ferstl, Karlsruhe (DE); Jun Gao, Neustadt (DE); Klaus Hahn, Kirchheim (DE); Pascal Hesse, Mannheim (DE); Jan Holoch, Leimen (DE); Klaus-Dieter Hungenberg, Birkenau (DE); Wolfram Husemann, Neustadt (DE); Renata Jovanovic, Ludwigshafen (DE); Wolfgang Kasten, Ludwigshafen (DE); Olaf Kriha, Neustadt (DE); Eckhard Neufeld, Limburgerhof (DE); Michel Pepers, Ludwigshafen (DE); Birgit Reinhard, Limburgerhof (DE); Bernhard Schmied, Frankenthal (DE); Rudolf Süttinger, Heidelberg (DE); Ping Zhang, Ludwigshafen (DE)

(73) Assignee: BASF SE (DE)

( * ) Notice: Subject to any disclaimer, the term of this patent is extended or adjusted under 35 U.S.C. 154(b) by 273 days.

(21) Appl. No.: 13/046,154

(22) Filed: Mar. 11, 2011

(65) Prior Publication Data

US 2011/0224316 A1 Sep. 15, 2011

Related U.S. Application Data

(60) Provisional application No. 61/313,179, filed on Mar. 12, 2010.

(51) Int. Cl.
*C08J 9/20* (2006.01)
*C08J 9/16* (2006.01)
*C08J 9/00* (2006.01)

(52) U.S. Cl.
CPC .... *C08J 9/20* (2013.01); *C08J 9/16* (2013.01); *C08J 9/00* (2013.01)
USPC .................. 521/56; 521/60; 521/85

(58) Field of Classification Search
CPC ................... C08J 9/00; C08J 9/16; C08J 9/20
USPC ............................................. 521/56, 60, 85
See application file for complete search history.

(56) References Cited

U.S. PATENT DOCUMENTS

| | | | | |
|---|---|---|---|---|
| 5,086,078 A | * | 2/1992 | Harclerode et al. | 521/58 |
| 5,086,079 A | | 2/1992 | Reese et al. | |
| 5,189,069 A | * | 2/1993 | Speikamp et al. | 521/56 |
| 5,290,819 A | | 3/1994 | Witt et al. | |
| 5,525,636 A | * | 6/1996 | Henn et al. | 521/59 |
| 5,905,096 A | * | 5/1999 | Lay et al. | 521/56 |
| 7,122,379 B2 | | 10/2006 | Wolf et al. | |

FOREIGN PATENT DOCUMENTS

| | | |
|---|---|---|
| EP | 304582 A1 | 3/1989 |
| EP | 575872 A1 | 12/1993 |
| EP | 1442284 A1 | 8/2004 |
| WO | WO-2007/144273 A1 | 12/2007 |

OTHER PUBLICATIONS

Reis et al., "Evidence of correlation between polymer particle size and Raman scattering," Polymer 44, 2003, pp. 6123-6128.
Santos et al., "Online Monitoring of Suspension Polymerization Reactions Using Raman Spectroscopy," Ind. Eng. Chem. Res., 2004, 43, pp. 7282-7289, published on web Aug. 5, 2004.
Reis et al., "Spectroscopic on-line monitoring of reactions in dispersed medium: Chemometric challenges," Analytica Chimica. Acta, 595, 2007 pp. 257-265, available online Apr. 29, 2007.

* cited by examiner

*Primary Examiner* — Randy Gulakowski
*Assistant Examiner* — Kara Boyle
(74) *Attorney, Agent, or Firm* — Novak Druce Connolly Bove + Quigg LLP

(57) ABSTRACT

The invention provides a process for preparing expandable styrene polymers which comprises the steps of:
(a) adding an aqueous phase comprising a suspension stabilizer and an organic phase comprising styrene and an initiator to a reactor,
(b) commencing the addition of a blowing agent at a styrene conversion in the range from 40 to 70% and adding the blowing agent over a period ranging from 30 to 60 minutes,
(c) adding a stabilizer to stabilize the bead size distribution of the expandable styrene polymer at a styrene conversion in the range from 65 to 99%.

16 Claims, No Drawings

PREPARING EXPANDABLE STYRENE POLYMERS

RELATED APPLICATIONS

This Application claims the benefit of U.S. Provisional Application 61/313,179 filed on Mar. 12, 2010 which is incorporated by reference.

This invention relates to a process for preparing expandable styrene polymers having a narrow bead size distribution coupled with a high specific reactor yield by polymerizing the monomers in an aqueous suspension in the presence of a volatile blowing agent.

Foams based on styrene polymers have acquired immense technical importance as a thermally insulating and packaging material. They are generally produced on a large industrial scale by first preparing expandable styrene polymers by suspension polymerization of styrene in the presence of a blowing agent, heating these expandable styrene polymers to foam them up to form particles of foamed material, and then welding these particles of foamed material together in molds to form shaped articles.

The suspension polymerization in question is carried out in the presence of suspension stabilizers and customary styrene-soluble polymerization initiators.

The suspension stabilizers used, in addition to molecular colloids such as polyvinyl alcohol (PVA) and polyvinylpyrrolidone (PVP), typically include sparingly soluble salts such as $Ca_3(PO_4)_2$ (known as Pickering salts) combined with alkali or alkaline earth metal alkanesulfonates.

EP-A 575 872 discloses a process for preparing bead-shaped expandable styrene polymers by polymerizing styrene in an aqueous suspension in the presence of blowing agents. The suspension stabilizer system used includes, for example, a mixture of magnesium pyrophosphate, sodium alkanesulfonates and sodium acrylate. The disadvantage of this process is that a comparatively broad bead size distribution is attained. The result is that the desired bead fractions are not obtainable without simultaneous formation of so-called edge fractions.

A process for preparing expandable styrene polymers having a comparatively narrow bead size distribution by polymerizing styrene in aqueous suspension is known from EP-A 304 582. The stabilizer system used is a mixture of an organic protective colloid, for example polyvinylpyrrolidone or hydroxyethylcellulose, and an inorganic stabilizer, for example a calcium or barium phosphate or sulfate. To control the bead size distribution, from 50 to 500 ppm of a preferably sparingly soluble carbonate are added to the suspension. The disadvantage of this process is that the organic protective colloids cause substantial contamination of the wastewater, which has to be treated, which is costly and inconvenient.

A further process for preparing expandable suspension polymers having a narrow bead size distribution is known from WO 2007/144273. In the process description therein, a styrene-containing organic phase is metered into a stirred tank over a period ranging from 5 to 60 minutes at the same time as an aqueous phase. Owing to possible temperature fluctuations due to heat release in the course of the reaction to form the styrene polymer, the process described in WO 2007/144273 likewise leads to fluctuations in the bead size distribution.

Monomer conversion can be measured by means of Raman spectroscopy for example. This is described for example in J. C. Santos et al., *Online Monitoring of Suspension Polymerization Reactions Using a Raman Spectroscopy*, Ind. Eng. Chem. Res., 2004, 43, pages 7282-7289. It is also known from EP-B 1 442 284 to use Raman spectroscopy to determine the progress of graft polymerizations. Raman spectroscopy is used there to monitor a process. Raman spectroscopy is not used to effect an influence on bead size distribution.

That Raman spectra of suspension polymerizations contain information about particle size has already been shown for example in Santos, J. C.; Reis, M. M.; Machado, R. A. F.; Bolzan, A.; Sayer, C.; Giudici, R.; Araújo, P. H. H., Ind. Eng. Chem. Res., 2004, 43, 7282-7289; Reis, M. M.; Araújo, P. H. H.; Sayer, C.; Giudici, R., Anal. Chim. Acta, 2007, 595, 257-265 and Reis, M. M.; Araujo, P. H. H.; Sayer, C.; Giudici, R., Polymer, 2003, 44, 6123-6128. However, it was only shown that such information is present. Using the information, particularly to adjust bead size, is not derivable from these documents.

It is an object of the present invention to provide an improved process for preparing expandable styrene polymers which produces a bead size distribution for the expandable styrene polymers that varies only minimally around a readily controllable average diameter, and which permits a high specific reactor yield.

We have found that this object is achieved by a process for preparing expandable styrene polymers which comprises the steps of:

(a) adding an aqueous phase comprising a suspension stabilizer and an organic phase comprising styrene and an initiator to a reactor, (b) commencing the addition of a blowing agent at a styrene conversion in the range from 40 to 70% and adding the blowing agent over a period ranging from 30 to 90 minutes, (c) adding a stabilizer to stabilize the bead size distribution of the expandable styrene polymer at a styrene conversion in the range from 65 to 99%.

Adding the individual components as a function of the styrene conversion makes it possible to achieve bead size distributions having fewer fluctuations than in existing processes, including more particularly compared with those processes where metering is time-based.

It is more particularly possible to use addition as a function of styrene conversion to even out fluctuations in bead size distribution which are due for example to impurities in the styrene or the water used for preparing the suspension, due to variations in initiator quality, irregularities in temperature control and inaccuracy in metered quantities. Impurities in this connection are more particularly inhibiting impurities, for example phenols.

A further advantage of conversion-based addition of the individual components is that coagulation of the organic phase in the suspension is made less likely since process irregularities are evened out. More particularly, bead size determination during the manufacturing operation will detect incipient coagulation, making it possible to take timely countermeasures, for example adding the stabilizer to stabilize the bead size distribution.

In one preferred embodiment of the present invention, the addition to a reactor of the aqueous phase comprising suspension stabilizer and of the organic phase comprising styrene and an initiator takes place over a period ranging from 5 to 60 minutes. It is further preferable for the start of the metering of the organic phase comprising styrene and an initiator to commence—with a short time delay—after the metering of the aqueous phase comprising suspension stabilizer has already started. This ensures that the filling of the reactor commences with water in excess. The concurrent metering of the two phases shortens the reactor cycle time by the time for metering the aqueous phase minus the time delay. Preferably, the metering of the organic phase comprising styrene and an initiator takes place from 1 to 20 minutes and more preferably from 2 to 5 minutes after commencement of the metering of the aqueous phase and lasts from 1 to 20 minutes and more preferably from 2 to 5 minutes longer after completion of the metering of the aqueous phase.

To shorten reactor cycle time further, that fraction of the suspension stabilizer-containing aqueous phase which is attributable to water only can either be preheated in an initial-charge tank and/or heated up during filling. Preheating the water of the aqueous phase results in a higher temperature being achieved at the end of reactor filling. This shortens reactor cycle time by the time interval hitherto needed to heat the reactors to the now attainable temperature after filling. The reactor contents are preferably brought to an internal temperature in the range from 30 to 90° C. and more preferably in the range from 35 to 75° C. by the time the metering of the two phases is completed.

By way of suspension stabilizer the aqueous phase preferably comprises magnesium pyrophosphate, tricalcium phosphate and/or magnesium sulfate. The organic phase in addition to styrene preferably comprises organic peroxides as an initiator. The volume ratio of the styrene- and initiator-containing organic phase to the suspension stabilizer-containing aqueous phase is generally in the range from 2:1 to 1:2, preferably in the range from 1.6:1 to 1:1.6 and more particularly in the range from 3:2 to 1:1.

A hydroxyalkylamine can be added in the course of the preparation of the aqueous suspension or during the heating-up phase before reaching a temperature of 100° C. The addition of the hydroxyalkylamine has a positive effect on the foam structure of shaped articles produced from the styrene polymer. It is particularly preferable for the hydroxyalkylamine to be initially charged in the organic phase comprising styrene and an initiator. The hydroxyalkylamine used is preferably an alkyldi(2-hydroxyethyl)amine and more preferably $C_{12}/C_{14}$ alkyldi(2-hydroxyethyl)amine, which is commercially available from Akzo under the name of Armostat® 400. The hydroxyalkylamine is typically initially charged, or is added at a temperature of less than 100° C., i.e., at a conversion of less than 20%. Preferably, the hydroxyalkylamine is initially charged.

Styrene polymers for the purposes of the present invention are polystyrene and copolymers of styrene with other $\alpha,\beta$-olefinically unsaturated compounds comprising at least 50 parts by weight of styrene in copolymerized form. Possible comonomers to use in the process of the present invention accordingly include for example: $\alpha$-methylstyrene, ring-halogenated styrenes, ring-alkylated styrenes, acrylonitrile, esters of acrylic or methacrylic acid with alcohols having 1 to 8 carbon atoms, N-vinyl compounds, such as vinylcarbazole, or else small amounts of compounds comprising two polymerizable double bonds, examples being butadiene, divinylbenzene or butanediol diacrylate.

The process of the present invention utilizes as preferred volatile blowing agents from 1% to 10% by weight and preferably from 3% to 8% by weight of a $C_3$— to $C_7$— hydrocarbon, examples being propane, butane, isobutane, n-pentane, i-pentane, neopentane and/or hexane. In principle, however, other volatile substances can also be used. Particular preference is given to using n-pentane and i-pentane, typically as a mixture.

The polymerization is initiated by means of customary styrene-soluble initiators. Suitable initiators include for example dibenzoyl peroxide, tert-butyl perbenzoate, dicumyl peroxide, di-tert-butyl peroxide and mixtures thereof, preferably in amounts of 0.2% to 1% by weight and more particularly in amounts of 0.3% to 0.7% by weight based on the monomers.

The styrene polymers may further comprise customary additions of other substances that endow the expandable products with particular properties. Possible added substances include for example flame retardants based on organobromine or organochlorine compounds, examples being trisdibromopropyl phosphate, hexabromocyclododecane, tetrabromobisphenol A derivatives, brominated diphenylethanes, chloroparaffin and also synergists for flame retardants such as dicumyl and highly decomposable, organic peroxides; further antistats, stabilizers, lubricants, fillers and substances which have an anti-stick effect in the prefoaming step, for example zinc stearate, melamine-formaldehyde condensates or silica, and also agents to shorten the demolding time at the final foaming stage, examples being glyceryl esters or hydroxycarboxylic esters. The added substances can be present as a homogeneous dispersion in the particles or as surface coating, depending on the intended effect.

Suitable added substances to reduce thermal conductivity are carbon particles such as carbon black and graphite. Any customary variety of carbon black is suitable, although the lampblack having a particle size of 80 to 120 nm is preferred. Carbon black is preferably used in amounts of 2% to 10% by weight. However, graphite is particularly suitable, with an average particle size of 0.5 to 200 µm, preferably of 1 to 25 µm and more particularly of 2 to 20 µm, a bulk density of 100 to 500 g/l and a specific surface area of 5 to 20 m$^2$/g being preferred. Natural graphite can be used or ground synthetic graphite. Graphite particles are present in the styrene polymer in amounts of 0.1% to 25% by weight and more particularly in amounts of 0.5% to 8% by weight.

The added substances can be added in the process of the present invention or applied subsequently to the expandable styrene polymers prepared according to the present invention, depending on the intended effect.

The suspension polymerization of styrene is known per se. It is described for example in Kunststoff-Handbuch, volume V, "Polystyrol", Karl Hanser Verlag, 1969, pages 679-688. In general, styrene is suspended in water with or without the aforementioned comonomers, and polymerized in the presence of organic or inorganic suspension stabilizers.

The process of the present invention provides bead-shaped expandable styrene polymers prepared by polymerization of styrene with or without up to 50% by weight of the aforementioned comonomers, in an aqueous suspension, the polymerization being preceded, followed or accompanied by the addition of the above-described blowing agents and, optionally, customary added substances in effective amounts.

The polymerization can also be carried out in the presence of a customary chain transfer agent which regulates the molecular weight. Preference is given to using tert-dodecyl mercaptan or DMS (dimeric $\alpha$-methylstyrene). The regulator is generally used in an amount of 0.001% to 0.5% by weight based on monomers.

The aqueous suspension is preferably stabilized using diphosphates or phosphates, more preferably magnesium pyrophosphate or tricalcium phosphate.

The process of the present invention preferably utilizes a mixture of magnesium pyrophosphate, a secondary alkali or alkaline earth metal alkanesulfonate and optionally an unsaturated carboxylate as suspension stabilizer system. The carboxylate improves stabilizing power and prevents reactor wall fouling. In addition, product properties such as expandability and electrostatic chargeability are also beneficially influenced.

Magnesium pyrophosphate is generally used in a concentration between 0.03% and 2.0% by weight, preferably between 0.05% and 1.0% by weight and more preferably between 0.1% and 0.5% by weight based on the aqueous phase.

The magnesium pyrophosphate is preferably prepared immediately before the polymerization, by combining very concentrated solutions of pyrophosphate and magnesium ions, the amount of magnesium salt used being at least that stoichiometrically required to precipitate magnesium pyrophosphate. The magnesium salt can be present in solid form or in aqueous solution. In one preferred embodiment, the magnesium pyrophosphate is prepared by combining aqueous solutions of sodium pyrophosphate ($Na_4P_2O_7$) and magnesium sulfate ($MgSO_4.7H_2O$). The magnesium salt is added in at least the stoichiometrically required amount, preferably in the stoichiometric amount. It is advantageous for the process of the present invention when there is no excess of alkali metal pyrophosphate.

The expandable styrene polymers may further be prepared using emulsifiers, preferably emulsifiers comprising sulfonate groups, so-called extenders. These extenders include for example sodium dodecylbenzenesulfonate, long-chain alkanesulfonates, vinylsulfonate and diisobutylnaphthalenesulfonate. The extenders used are preferably alkali metal salts of dodecylbenzenesulfonic acid and/or alkali metal salts of a mixture of $C_{12}$-$C_{17}$ alkanesulfonic acids. A particularly suitable mixture of $C_{12}$-$C_{17}$ alkanesulfonates consists of predominantly secondary sodium alkanesulfonates having an average chain length of $C_{15}$. Such a mixture is available from Bayer AG under the name "Mersolat® K30". Extenders enhance the ability of sparingly soluble inorganic compounds to stabilize the suspension.

Extenders are generally used in amounts between 0.5% and 15% by weight and preferably in amounts between 2% and 10% by weight, all based on magnesium pyrophosphate.

By adapting the metering times of the extender, the bead diameter d can be adjusted to desired values within wide limits, for example in the range from 0.5 to 3 mm. In the process of the present invention, the extender is preferably added at a styrene conversion in the range from 20% to 50%. The extender is preferably added in the form of an extender solution. It is particularly preferable to add the extender solution at a styrene conversion in the range from 25% to 45%.

Bead size distribution may be influenced in a particularly preferred manner by the addition of carbonate and/or bicarbonate. Preferably, from 1 to 1000 ppm and preferably from 50 to 500 ppm based on the aqueous phase of a water-soluble carbonate and/or bicarbonate are added in the course of the polymerization. When a carboxylate is used in the form of an acid, for example acrylic acid, this acid will combine with carbonate ions to form an equivalent amount of bicarbonate. This has to be taken into account in relation to the quantitative observation which follows. It has been determined that a molar ratio of carbonate:bicarbonate ions in the range from 3:0 to 1:5 and preferably in the range from 1:0 to 1:2 in the suspension is optimal. Suitable carbonates and/or bicarbonates are of sodium, of potassium and of ammonium. It is beneficial to add the carbonates and/or bicarbonates in the course of the polymerization at a styrene conversion in the range from 10% to 40%. The carbonate and/or bicarbonate here is preferably added in the form of a solution.

It has been determined that it is beneficial to the stability of the suspension for a solution of polystyrene (or of a corresponding styrene copolymer) in styrene (or the mixture of the styrene with comonomers) to be present at commencement of the suspension polymerization. Preference here is given to proceeding from a 0.5% to 30% by weight solution and more particularly 3% to 20% by weight solution of polystyrene in styrene. Fresh polystyrene may be dissolved in monomers, but it is convenient to use so-called edge fractions which are screened out as oversize or undersize particles in the classification of the bead spectrum obtained in the preparation of expandable polystyrene.

The expandable styrene polymer particles prepared according to the present invention are preferably from 0.2 to 4 mm in diameter. They can be prefoamed in a conventional manner, for example with steam, into foam particles having a diameter between 0.1 and 2 cm and a bulk density between 5 and 100 $kg/m^3$. The prefoamed particles can then be end-foamed in a conventional manner to form molded foam articles having a density of 5 to 100 $kg/m^3$.

The process of the present invention, wherein the individual components are added as a function of styrene conversion, is an accurate and precise way to control the particle diameters of the expandable bead-shaped styrene polymers. The expandable styrene polymers comprising blowing agent have low internal water contents, a high expanding capacity and good and constant processing properties. Moreover, their tendency to develop an electrostatic charge build-up is minimal.

It is also possible to use various organic monomeric phases without readjustment of the stabilizer system, for example for flame-retarded and non-flame-retarded brands.

On completion of the polymerization cycle time, the reactor is typically jacket-cooled down to a temperature between 60 and 30° C. and the contents are transferred via a floor valve and a subsequent transfer pump into a suspension tank.

To be able to add the respective components such as blowing agent, stabilizer for stabilizing the bead size distribution, carbonate and/or bicarbonate and also extender solution at the appropriate styrene conversion, it is necessary for styrene conversion to be continuously monitored during the reaction. During the reaction, a multiplicity of measurable properties and parameters of the reaction mixture will change, examples being concentrations of components and products, temperature, pressure, density, refractive index, viscosity, molecular weight distribution, polymeric microstructure, pH values, electric conductivity, acid and OH numbers in the case of condensation polymerizations, particle size distribution and particle morphology. Typically, however, chain-growth addition polymerizations are only continuously measured for reaction temperature, pressure, stirrer speed and/or torque when a stirred tank is used, cooling water temperature, fill level and, if appropriate, the component and product flows. Conversion is normally not measured.

However, a person skilled in the art will be aware of various ways of performing an online determination of conversion. These can be determined for example via refractometry, densitometry and dilatometry, where there is continuous determination of the changes in refractive index and/or density, which correlate with the monomer conversion. It is further possible to determine conversion by means of ultrasound measurements, since the speed of sound in monomer and polymer differs. It is similarly possible to make differences in the dielectric constants of monomer and polymer the basis for conversion determination via dielectric measurements.

Product composition data is obtainable for example via spectroscopic and chromatographic methods. Chromatographic methods are for example high-performance liquid chromatography (HPLC), gas chromatography (GC) and size exclusion chromatography (SEC). However, these are very difficult to realize online, especially for heterogeneous reaction systems. Nor is gravimetric determination of the solids content practicable for online operation.

Spectroscopic determination of conversion can be effected for example via IR spectroscopy, NIR spectroscopy or Raman spectroscopy. It is further possible to use UV measurements or fluorescence measurements. NMR spectroscopy methods can also be used.

Styrene conversion is preferably determined using spectroscopic methods of measurement. Raman spectroscopy is very particularly preferred for use as spectroscopic method of measurement.

In Raman spectroscopy, light in the near infrared region and in the visible region is used for excitation and detection. One advantage of using Raman spectroscopy for determining styrene conversion in the context of the present invention is that water has only weak Raman scattering. A further advantage of Raman spectroscopy is the high intensity of the C=C double bond of the monomer molecules and the possibility of determining partial conversions of monomer in copolymerizations. Even univariant approaches can be utilized here with the aid of an internal standard vibration. This is described for example in M. van den Brink, J. Appl. Polym. Sci., 2001, 79, pages 426-436.

Since the process of the present invention is used particularly in order that a very homogeneous bead size distribution may be achieved, particle size is also a decisive unit. One preferred embodiment accordingly comprises also measuring the particle size of the expandable styrene polymer and adding at least one component only once a predetermined particle size is reached. So particle size is taken into account for adding the components as well as styrene conversion, providing another possible way of influencing the particle size. This makes it possible to achieve an even narrower particle size distribution. It is a further advantage that the size of the particles to be prepared can be adjusted in a simple manner.

It is particularly preferable when the stabilizer for stabilizing bead size distribution is only added once a predetermined particle size is reached. The stabilizer used for stabilizing the bead size distribution is preferably a sulfate, more particularly an alkaline earth metal sulfate and among these preferably magnesium sulfate. Addition of the stabilizer for stabilizing the bead size distribution prevents coalescence of the individual styrene polymer particles. To prevent coalescence and hence keep particle size constant, the stabilizer for stabilizing the bead size distribution is accordingly preferably added once a predetermined particle size is reached, this predetermined particle size preferably being the desired particle size for the styrene polymer prepared. Adding the stabilizer for stabilizing the bead size distribution on attainment of the predetermined particle size makes it possible to achieve very good reproducibility of the average bead diameter in the particular batch for preparing the expandable styrene polymer.

Since the addition of components as a function of particle size is particularly relevant when the desired average particle diameter has almost been reached, it is generally sufficient to take account of the measurement of the particle size of the expandable styrene polymer only from a styrene conversion of at least 50%. Typically, particle size is determined throughout the entire manufacturing process, but the results only become sensible at high conversions. By only taking account of the particle size of the expandable styrene polymer from a styrene conversion of at least 50% there is no need to monitor several process parameters at lower styrene conversions, which is a way to simplify the operation.

One advantage of particle size-dependent metering of components, more particularly of the stabilizer for stabilizing bead size distribution, is that this makes it easier to switch to other particle sizes in the manufacturing operation from one batch to the next.

In a particularly preferred embodiment of the process of the present invention, the adding of components which are added at a low styrene conversion is effected as a function of the styrene conversion and the adding of components which are added at a high styrene conversion is effected as a function of the styrene conversion or as a function of the particle size, with, for example, the stabilizer for stabilizing the bead size distribution, for example magnesium sulfate, typically being added as a function of the particle size only and the volatile blowing agent being added as a function of conversion.

In the context of the present invention, a low styrene conversion is to be understood as meaning a styrene conversion of no more than 50% and a high styrene conversion is to be understood as meaning a styrene conversion of not less than 50%.

EXAMPLES

Preparing an $Mg_2P_2O_7$ Suspension

To prepare an $Mg_2P_2O_7$ suspension, 21.9 kg of $Na_4P_2O_7$ are dissolved in 758.3 kg of water at room temperature with stirring. To this solution is added a solution of 41.2 kg of $MgSO_4.7H_2O$ in 178.6 kg of water followed by further stirring. The result is an aqueous suspension of predominantly amorphous magnesium pyrophosphate.

Inventive Example 1

In a pressure-resistant stirred tank made of corrosion-resistant stainless steel, 780 kg of the $Mg_2P_2O_7$ suspension are metered into 6200 kg of water followed by 1000 kg of rinse water. This is followed by the addition of 9000 kg of styrene together with 200 kg of dissolver material, 25 kg of dicumyl peroxide, 10 kg of Lucidol® (75% strength), 13 kg of polyethylene wax and 2.7 kg of dimeric a-methylstyrene.

The stirred tank is sealed and a nitrogen overpressure of 0.5 bar is set. The stirred tank is then heated to 95° C. at a heating rate of 0.833° C./min. Thereafter, the mixture is heated to 137° C. at a constant heating rate. The temperature of 137° C. is reached at a monomer conversion in the reactor of 95.8%. The mixture is subsequently stirred at 137° C. for a further 138 minutes.

On reaching a monomer conversion of 28.6%, 1.92 kg of $Na_2CO_3$ and 3.04 kg of $NaHCO_3$ dissolved in 80.04 kg of water are added over a period of 2 minutes. After 33.3% of the styrene has been converted into polystyrene, 85 kg of a 1% aqueous solution of Mersolat® K30 are added during 2 minutes. Once a conversion of 58.9% is reached, the metered addition is commenced of 685 kg of pentane. The metered addition of pentane takes place over a period of 40 minutes. A final metered addition of a solution of 14.2 kg of magnesium sulfate in 68.8 kg of water over a period of 2 minutes is initiated at a conversion of 88.4%.

To be able to add the sodium carbonate- and sodium bicarbonate-containing solution, the extender solution and the pentane at their envisaged conversion levels, the conversion of styrene is determined using a dispersive Raman spectrometer (Kaiser Optical Systems SARL). Within a few minutes from commencement of the heating phase in the reactor, the radiation at a wavelength of 785 nm, produced by a semiconductor laser, was coupled into the reactor via glass fiber cable and a dip probe. Some of the scattered radiation was recaptured via the probe and returned by means of glass fiber cables to the central spectrometer unit. The elastically scattered Rayleigh radiation was separated off by means of a notch filter and the individual wavelengths of the light were locally split via a transmission grating. The intensities of the inelastically scattered light were measured via a charge-coupled device (CCD) detector with appropriate local resolution. The spectra were computed by a separate computer. The recording frequency of the spectra and the number of accumulations were chosen as to ensure a very high signal-to-noise ratio combined with high time resolution. Spectra for conversion computation were obtained at time intervals of 7 to not more than 18 seconds. The conversion values were transmitted in real time into the process control system, and then were used for conversion-based metering of the sodium carbonate/bicarbonate solution, the extender solution, the pentane and the magnesium sulfate.

The addition of the magnesium sulfate was initiated by attainment of a desired average bead size. Particle size here is likewise determined by Raman spectroscopy.

That Raman spectra of suspension polymerizations contain information about particle size has already been shown for example in Santos, J. C.; Reis, M. M.; Machado, R. A. F.; Bolzan, A.; Sayer, C.; Giudici, R.; Araújo, P. H. H., *Ind. Eng. Chem. Res.*, 2004, 43, 7282-7289; Reis, M. M.; Araújo, P. H. H.; Sayer, C.; Giudici, R., *Anal. Chim. Acta*, 2007, 595, 257-265 and Reis, M. M.; Araújo, P. H. H.; Sayer, C.; Giudici, R., *Polymer*, 2003, 44, 6123-6128.

Conversion was computed via a univariant approach. In this univariant approach, the decrease in the concentration of monomeric styrene is computed via the decrease in the intensity of the Raman band of the C=C stretching vibration. The corresponding band peak is positioned at about 1630 cm$^{-1}$. However, absolute Raman intensities depend on a variety of influences. Some of these, for example temperature, particle size, density and solvent concentration, change greatly in the course of a suspension polymerization. Hence it is necessary to use a further band in the spectrum as an internal reference. For this, the Raman band of the ring breathing vibration of the aryl ring at around 1000 cm$^{-1}$ was used. Although its intensity differs for monomeric and polymeric styrene, but since the extent of the intensity decrease is known, this effect can be compensated by means of an appropriate correction factor.

Comparative Example 1

Inventive example 1 was repeated to prepare a styrene polymer in a pressure-resistant stirred tank except that sodium carbonate/bicarbonate, extender solution, pentane and magnesium sulfate were added on a time basis as described in WO 2007/144273 and not as a function of conversion.

Inventive Example 2

Inventive example 1 was repeated to prepare a styrene polymer in a pressure-resistant stirred tank except that magnesium sulfate was not added on attainment of a predetermined particle diameter, but on a conversion basis, on attainment of conversion of 88.4%.

The table which follows shows the average bead size d' and the bead size distribution measure β for each of the 25 runs carried out according to inventive example 1, inventive example 2 and comparative example 1. The mean bead size and the standard deviation were determined for each run.

The average bead size d' and the bead size distribution measure β were determined according to Rosin-Rammler-Sperling-Bennett. The bead size distribution is the entire distribution with β being a measure of its width and d' having the meaning that 63.2% of the beads have a diameter of not more than d'.

The bead size distributions of the bead polymers obtained from comparative example 1 were determined via sieving and the results for the average bead size d' were correlated with the Raman intensities of the spectra at high reaction times, i.e., at approximately complete monomer conversion. In this method, the intensities of individual bands in the Raman spectrum, more particularly in the region of low wavenumbers, are multiplied by correlation factors, the results are summed and, if appropriate, an offset is added. However, the results of the average bead size d' with this absolute method are greatly dependent on equipment factors such as the state of the optical cables, of the laser and of the lens. Changes in spectrometer settings such as scan duration and number of accumulations would likewise lead to incorrect results for the average bead size d'. In one particularly preferred version of the determination of the average bead size d' via Raman spectroscopy, it is not the absolute intensities of the Raman intensities which are used for calculating the bead diameter but band intensities which have been standardized for characteristic intensity values at low monomer conversions (for example the reaching of 80° C. internal temperature). This significantly increases the accuracy and robustness of the determination of the average bead size d' via Raman spectroscopy.

TABLE 1

Average diameters d' and bead size distribution

| Run | Time-based metered additions | | Conversion-based metered additions | | d'-Based metered addition of MgSO$_4$ solution | |
|---|---|---|---|---|---|---|
| | d'/mm | β/° | d'/mm | β/° | d'/mm | β/° |
| 1 | 0.696 | 14.1 | 0.922 | 7.8 | 0.800 | 9.4 |
| 2 | 0.829 | 11.0 | 0.946 | 7.4 | 0.871 | 8.6 |
| 3 | 0.919 | 9.9 | 0.923 | 7.6 | 0.847 | 9.6 |
| 4 | 0.733 | 8.9 | 0.899 | 7.9 | 0.867 | 10.2 |
| 5 | 0.937 | 9.2 | 0.894 | 8.6 | 0.873 | 9.3 |
| 6 | 0.901 | 8.7 | 0.854 | 9.8 | 0.859 | 9.3 |
| 7 | 0.866 | 8.6 | 0.813 | 9.4 | 0.796 | 9.0 |
| 8 | 0.743 | 9.9 | 0.870 | 9.2 | 0.819 | 9.9 |
| 9 | 0.970 | 9.3 | 0.828 | 9.8 | 0.784 | 9.5 |
| 10 | 0.908 | 9.1 | 0.907 | 7.8 | 0.813 | 9.7 |
| 11 | 0.964 | 8.0 | 0.844 | 10.0 | 0.774 | 10.8 |
| 12 | 0.861 | 9.9 | 0.816 | 10.1 | 0.804 | 9.0 |
| 13 | 0.735 | 11.7 | 0.874 | 8.5 | 0.838 | 9.6 |
| 14 | 0.727 | 11.3 | 0.922 | 9.4 | 0.844 | 8.6 |
| 15 | 0.701 | 9.6 | 0.868 | 9.2 | 0.883 | 7.9 |
| 16 | 0.801 | 8.5 | 0.855 | 9.6 | 0.895 | 8.1 |
| 17 | 0.748 | 8.4 | 0.862 | 10.2 | 0.880 | 8.2 |
| 18 | 0.935 | 8.6 | 0.741 | 11.1 | 0.879 | 8.7 |
| 19 | 0.849 | 8.8 | 0.775 | 10.7 | 0.885 | 9.2 |
| 20 | 0.887 | 9.8 | 0.731 | 10.9 | 0.887 | 7.7 |
| 21 | 0.861 | 8.1 | 0.771 | 10.3 | 0.838 | 9.1 |
| 22 | 0.890 | 8.9 | 0.770 | 9.3 | 0.871 | 8.4 |
| 23 | 0.761 | 10.0 | 0.795 | 8.8 | 0.812 | 8.8 |
| 24 | 0.960 | 8.9 | 0.816 | 8.0 | 0.813 | 8.4 |
| 25 | 0.886 | 8.8 | 0.866 | 9.4 | 0.830 | 8.7 |
| Mean | 0.843 | 9.5 | 0.846 | 9.2 | 0.842 | 9.0 |
| Standard deviation | 0.089 | 1.3 | 0.060 | 1.1 | 0.036 | 0.7 |

Runs carried out with time-based metered addition correspond to comparative example 1. In inventive runs with conversion-based metered addition as per inventive example 2, the individual components were each added on a conversion basis only. In the last two columns, the components were added on a conversion basis and the magnesium sulfate was added as a function of the particle size as per inventive example 1.

Analysis of the standard deviations of the average particle sizes d' shows that conversion-based metered addition achieves a reduction in the variability of the average particle size of more than 30% compared with time-based metered addition. A particle size-based addition of magnesium sulfate even reduces the variations in the average particle size d' by approximately 60%.

The β values are a measure of the width of the bead size distribution; high β values correspond to a high proportion of edge fractions. On transitioning from a time-based metered addition to a particle size-based metered addition, a reduction in the β values is observed. In other words, Raman-spectroscopic process control is able to reduce not just the variability of the average particle diameter but also the proportion of edge fractions.

Although a reliable determination of the average particle diameter via Raman spectroscopy is only possible at high conversions, process irregularities which lead to a coagulation of the batch can already be detected at low conversions. This detection of the onset of coagulation is typically possible earlier than, for example, by tracing the stirrer torque.

This time interval of up to 30 minutes prior to complete coagulation of the organic phase makes it possible in most cases to take suitable countermeasures, for example an immediate metered addition of magnesium sulfate, at an early time in order that complete coagulation of the styrene polymer beads prepared may be prevented. True, the bead polymer obtained thereby is not fully on-spec, if at all, and therefore can frequently not be sold or used, but it may be possible to recycle the material into the operation. One advantage is that the timely addition of the magnesium sulfate solution to prevent complete coagulation makes it possible to avoid manual cleaning of the reactor and outage times associated therewith.

We claim:

1. A process for preparing expandable styrene polymers which comprises the steps of:
  (a) adding an aqueous phase comprising a suspension stabilizer and an organic phase comprising styrene and an initiator to a reactor,
  (b) commencing the addition of a blowing agent to the reactor at a styrene conversion in the range from 40 to 70% and adding the blowing agent over a period ranging from 30 to 90 minutes,
  (c) adding a stabilizer to the reactor to stabilize the bead size distribution of the expandable styrene polymer at a styrene conversion in the range from 65 to 99%.

2. The process according to claim 1 wherein a solution comprising carbonate or bicarbonate or a mixture thereof is added at a styrene conversion in the range from 10 to 40%.

3. The process according to claim 1 wherein an extender solution is added at a styrene conversion in the range from 20 to 50%.

4. The process according to claim 1, wherein the styrene conversion is determined by a spectroscopic method of measurement.

5. The process according to claim 4 wherein Raman spectroscopy is used as the spectroscopic method of measurement.

6. The process according to claim 1, wherein the particle size of the expandable styrene polymer is measured and at least one component is not added until a predetermined particle size is reached.

7. The process according to claim 6 wherein a stabilizer for stabilizing the bead size distribution is not added until a predetermined particle size is reached.

8. The process according to claim 6, wherein the measurement of the particle size of the expandable styrene polymer is taken into account from a styrene conversion of at least 50%.

9. The process according to claim 6, wherein the adding of components which are added at a low styrene conversion is effected as a function of the styrene conversion and the adding of components which are added at a high styrene conversion is effected as a function of the styrene conversion or as a function of the particle size of the expandable styrene polymer.

10. The process according to claim 1, wherein the aqueous phase comprises magnesium pyrophosphate, tricalcium phosphate or magnesium sulfate or a mixture thereof.

11. The process according to claim 1, wherein the organic phase comprises styrene and at least one organic peroxide.

12. The process according to claim 1, wherein the blowing agent is a hydrocarbon of 3 to 7 carbon atoms.

13. The process according to claim 1, wherein the stabilizer for stabilizing the bead size distribution is an alkaline earth metal sulfate.

14. The process according to claim 1, wherein the stabilizer for stabilizing the bead size distribution is magnesium sulfate.

15. The process according to claim 2, wherein the carbonate or bicarbonate is of sodium, of potassium or of ammonium.

16. The process according to claim 3, wherein the extender in the extender solution is an emulsifier comprising sulfonate groups.

* * * * *